United States Patent [19]

Bacon

[11] 3,875,728
[45] Apr. 8, 1975

[54] BEARING ASSEMBLY
[75] Inventor: Roger J. Bacon, Holland, Wis.
[73] Assignee: FMC Corporation, San Jose, Calif.
[22] Filed: Jan. 29, 1973
[21] Appl. No.: 327,353

[52] U.S. Cl................. 56/17.5; 56/295; 308/36.4; 308/187.1
[51] Int. Cl......................................... A01d 45/02
[58] Field of Search.......... 56/295, 12.2, 16.9, 17.4, 56/255, 17.5; 308/187.1, 36.1, 36.3, 36.4

[56] References Cited
UNITED STATES PATENTS

| | | | |
|---|---|---|---|
| 2,154,564 | 4/1939 | Eisenlohr | 56/295 |
| 2,538,230 | 1/1951 | Boggs | 56/295 |
| 2,665,723 | 1/1934 | Urschel et al. | 56/295 X |
| 2,680,945 | 6/1934 | Reed | 56/295 X |
| 2,711,624 | 6/1955 | Crump | 56/295 |
| 2,765,611 | 10/1956 | King | 56/295 X |
| 3,774,982 | 11/1973 | Nakamura et al. | 308/187.1 |

*Primary Examiner*—Robert Peshock
*Assistant Examiner*—J. O. Lever
*Attorney, Agent, or Firm*—A. J. Moore; C. E. Tripp

[57] ABSTRACT

A bearing assembly for mowers or the like having a pair of bearings spread a maximum distance apart on a spindle within a fixed overall height partially due to securing a cutter mounting disc hub in abutting relation to the spindle shaft and placing one bearing within about one-sixteenth of an inch from the hub. A bearing housing is formed with a skirt which cooperates with the hub to act as a labyrinth seal for protecting the lower bearing from debris entering the bearing and for allowing the disc hub to sling water and debris away from the bearing. Cutter blade bolt shanks spaced from the axis of the spindle enter a lower annular sealing chamber above the hub and serve to chop any long pieces of grass or the like which may inadvertently enter the lower sealing chamber into small pieces thus preventing wrapping of such long material around the shaft.

3 Claims, 4 Drawing Figures

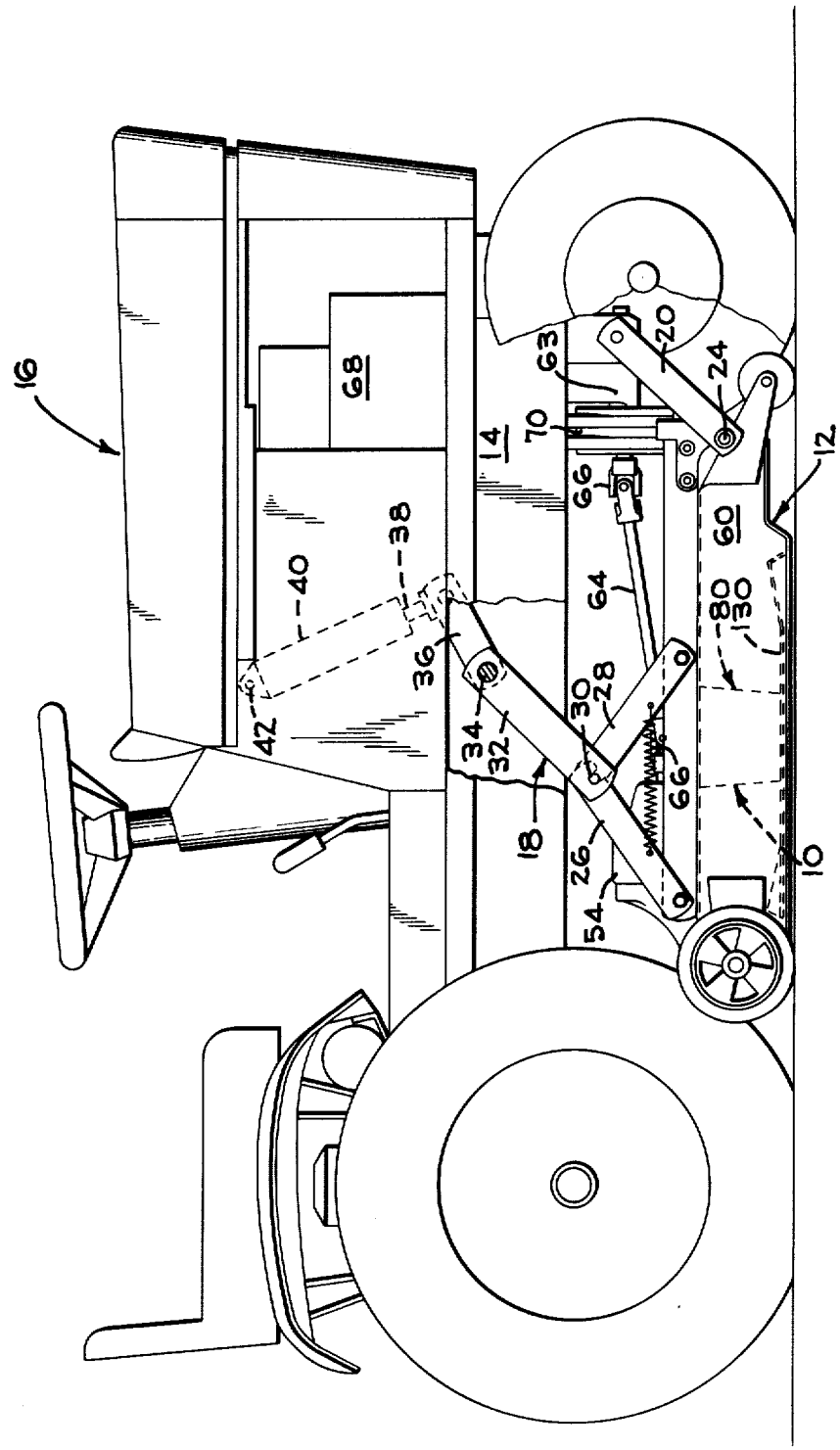

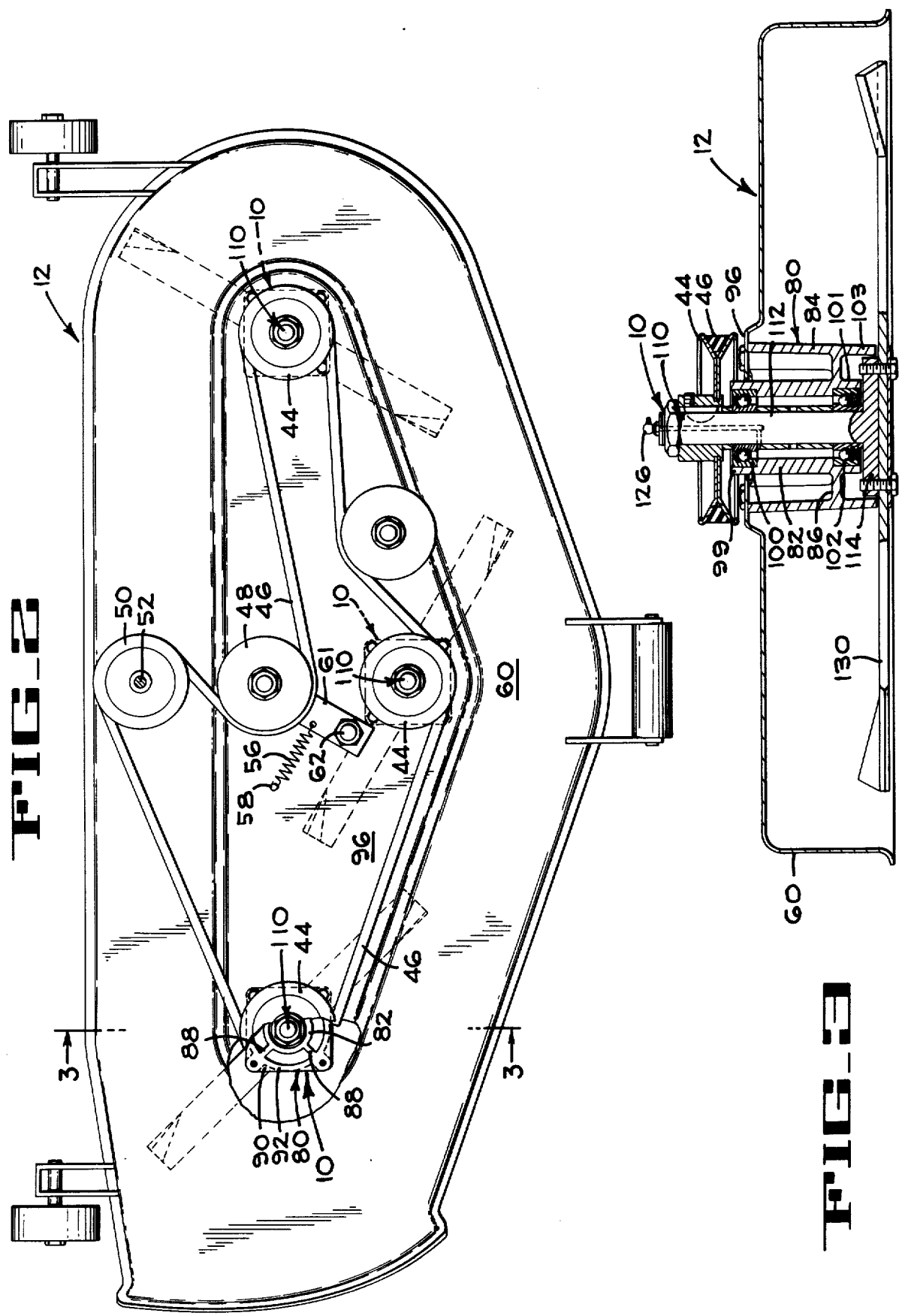

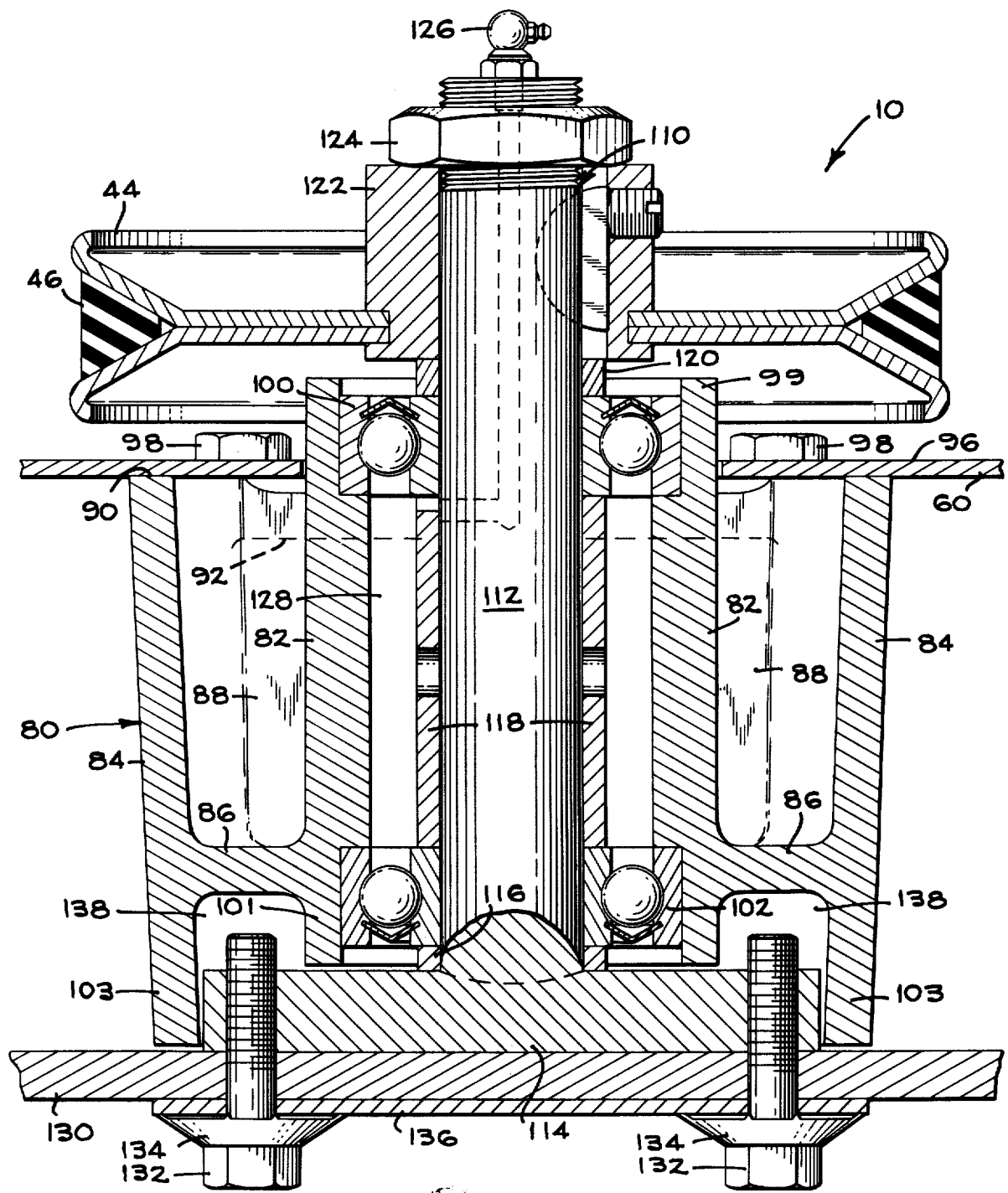
FIG_4

BEARING ASSEMBLY

BACKGROUND OF THE INVENTION

1. Field of the Invention

This invention pertains to bearing assemblies and more particularly relates to bearing assemblies for use with mowers or the like suspended below tractors wherein the overall height of the mower and bearing assembly must be limited to permit vertical raising and lowering of the assembly, and wherein the bearings are operating in an environment in which they are apt to be damaged by debris or moisture.

2. Description of the Prior Art

Bearings for use with mowers or the like suspended below tractors are necessarily somewhat vertically compact in order to permit the mower to be raised a sufficient distance above the ground during transportation from place to place. Because of the limited amount of vertical space available for the mower, the bearings of many cutter assemblies have heretofore been mounted closer together than desirable, thus increasing the wear and reducing the life span of the spindle bearings. Also, certain prior art bearing assemblies require complete disassembly of the bearing assemblies when it become necessary to remove the cutter blades.

SUMMARY OF THE INVENTION

The bearing assembly of the present invention includes a spindle having a disc hub abutting, and preferably inertia welded, directly to the lower end of the spindle with the lower bearing spaced only about one/sixteeth of an inch from the disc hub by a lower spacer. In addition, the bearing housing is formed so that a skirt projects over the outer edge of the disc thus defining a lower sealing chamber which greatly minimizes entry of grass clippings into the lower bearing, yet allows the disc to sling water outwardly away from the lower bearing. The housing also includes an upper bearing seat which projects through the upper wall of the mower housing and within the periphery of a fabricated cutter drive pulley keyed to the spindle. Thus, the bearings are protected from debris by either the drive pulley or housing skirt, and are spaced a greater distance apart than heretofore believed possible within the limited space available thereby minimizing wobble of the spindle shaft and increasing bearing life.

It is, therefore, one object of the present invention to provide a bearing assembly having bearings spaced a substantial distance apart relative to the space between a driving element and a driven tool.

Another object is to provide a compact bearing assembly designed to protect two spaced bearings from contamination while retaining a wide space between the bearings.

A further object is to provide a sealing effect between the spindle and spindle housing to minimize entry of elongated grass or other stringy material into a lower seal chamber, and to chop any stray material which may inadvertently enter the seal chamber into small pieces.

BRIEF DESCRIPTION OF THE DRAWINGS

FIG. 1 is a diagrammatic side elevation of a tractor supporting a mower of the type which employs at least one of the cutter bearing assemblies of the present invention.

FIG. 2 is a diagrammatic plan of a mower illustrating the location of three cutter bearing assemblies and a belt drive for the same, certain parts being removed.

FIG. 3 is a vertical central section taken along lines 3—3 of FIG. 2.

FIG. 4 is an enlarged vertical central section illustrating one of the bearing assemblies of the present invention and a portion of the mower housing and cutter.

DESCRIPTION OF THE PREFERRED EMBODIMENT

The cutter bearing assembly 10 (FIGS. 1 to 4) of the present invention is illustrated as being associated with a mower 12 (FIG.1) mounted on and below the chassis 14 of a tractor 16 by a lift assembly 18 of the type disclosed in United States Patent Application Ser. No. 312,011 filed by Joseph A. Federspiel on Dec. 4, 1972 now U.S. Pat. No. 3,796,028 which issued on March 12, 1974.

The right and left sides of the lift assembly 18 are identical and each side includes a forward link 20 pivoted to the chassis at 22 and to the mower at 24. Each side of the rear end of the mower is connected to the chassis by links 26 and 28 hooked to a pin 30 carried by the free end of a lift arm 32 keyed to a transverse shaft 34 journaled in the chassis 14. One end of an actuating lever 36 is keyed to the shaft 34 and has its other end connected to the piston rod 38 of a hydraulic cylinder 40 which is pivoted to the chassis 14 by a pin 42. Thus, the hydraulic cylinder 40 may be actuated to raise the mower 12 to a transport position above the ground or lower the mower to the illustrated operative position. Accordingly, it is apparent that in order to provide sufficient ground clearance for the mower when in its raised transport position, the overall vertical height of the mower itself is necessarily quite restricted.

As illustrated in FIG. 2, the mower 12 includes three cutter bearing assemblies 10, each of which includes a driving element or pulley 44. The pulleys 44 are driven by an endless belt 46 trained around the pulleys 44, around an idler pulley 48, and around a power input pulley 50 that receives its power from the output shaft 52 of a gearbox 54 (FIG. 1). Belt tension is maintained by a spring 56 connected between a clip 58 secured to the mower housing 60 and to one end of a lever 61 pivoted by a pin 62 to the mower housing 60, and having the idler pulley 48 journaled on its other end. The gear box 54 (FIG. 1) is coupled to a power take-off mechanism 63 by a telescoping drive shaft 64 and universal joints 66. The powered take-off mechanism 62 is driven from the tractor engine 68 by a belt drive 70.

Each cutter bearing assembly 10 is identical, and accordingly, only one of the assemblies will be described in detail.

As best illustrated in FIG. 3 and 4, each bearing assembly includes a spindle housing 80 which is preferably in the form of a metal casting having an inner annular wall 82 connected to an outer annular wall 84 by a horizontal ring 86 and radial ribs 88 (FIG. 2). The upper mounting surface 90 of the outer annular wall 84 is formed as a generally horizontal flange 92 (FIG. 2) having threaded holes therein. The spindle housing 80 is rigidly secured to the upper wall 96 of the mower housing 60 by cap screws 98.

As indicated in FIG. 4, the upper portion 99 of the inner annular wall 82 projects above the level of the mounting surface 90 through an aperture in the mower housing wall 96, and is counterbored to receive the outer race of an upper anti-friction bearing 100. The lower portion or skirt 101 of the inner annular wall 82 is likewise counterbored to receive a lower anti-friction bearing 102. It will be particularly noted that the lower end of the outer annular wall 84 defines a skirt 103 which projects downwardly below the plane of the lower edge of the inner annular wall 82 to define, in effect, a portion of a labyrinth seal. The sealing effect of the skirt 103 will be discussed in more detail hereinafter.

A spindle 110 includes a cutter shaft 112 which has a disc hub 114 concentric with and, preferably, inertia welded to the lower end of the shaft 112. During assembly of the spindle in the spindle housing 80, the shaft 112 is inserted upwardly (FIG. 4) through a thin lower spacer 116 of about one/sixteeth of an inch in thickness, through the lower bearing 102, through a central spacer 118, through the upper bearing 100, through an upper spacer 120, through the hub 122 of the associated pulley 44 which is keyed to the shaft 112, and through a nut 124 securely tightened on the upper end portion of the shaft to firmly hold the bearings, spacers, and pulley in the predetermined spaced relationship illustrated in FIGS. 3 and 4. A lubrication fitting 126 is screwed into the upper end of a shaft 112 and communicates with passageways in the shaft and in the central spacer 118 to direct grease into a large grease reservoir 128.

As clearly illustrated in FIG. 4, when the spindle 110 is assembled in the spindle housing 80 as above described, the upper surface of the disc hub 114 is closely adjacent the lower bearing and is shielded by the skirts 101 and 103 thereby greatly minimizing the entry of grass clippings into the lower bearing 100 thus serving as a labyrinth seal. It will also be noted that the upper surface of the disc hub 114 acts as a slinger for slinging water away from the lower bearing.

A driven element or tool illustrated as a cutter 130 in FIG. 3 is of well known design. The cutter 130 is bolted to the disc hub 114 of the spindle 110 by cap screws 132 positioned at evenly spaced intervals adjacent the periphery of the hub 114. Lock washers 134 on each cap screw 132 cooperate with a relatively soft rectangular plate 136 to firmly lock the cutter 130 to its hub 114.

In order to further minimize any tendency for grass clippings or the like, especially long grass clippings, from damaging the lower bearing 102, a lower annular seal chamber 138 is formed above the hub 114 and between the ring 86 and the skirts 101 and 103. The shanks of the capscrews 132 are of sufficient length to project into the seal chamber 138 and act as choppers which break long strands of grass, which may inadvertently enter the seal chamber 138, into small pieces thus preventing long pieces of grass or the like from wrapping around the shaft and damaging the lower bearing 102.

In the preferred embodiment of the present invention, the inner surfaces of the drive pulley 44 and cutter 130 are spaced apart about 3 ¼ inches while the outer surfaces of the bearings are spaced apart about 3 inches. Thus, in the preferred embodiment the distance between the outer surface of the two bearings is about 92% of the distance between the adjacent or inner surfaces of the driving and driven elements.

Although the bearing assembly of the present invention has been described and claimed in connection with a mower having vertically disposed spindle axes, it will be understood that the bearing assembly may be used in other environments and may be oriented with their axes in different attitudes. It will also be understood that the term "inertia welding" covers a process of rotating two abutting pieces to be welded together at sufficient speed and for a period sufficient to generate enough heat to weld the two pieces together.

From the foregoing description it is apparent that the bearing assembly of the present invention is ideally suited for operation in confined areas. The assembly includes bearings which are spaced a much greater distance apart than heretofore believed possible with the lower bearing being with about one-sixteenth of an inch from the cutter mounting hub and with the upper bearing projecting within the periphery of the drive pulley. The lower portion of the bearing housing includes a pair of skirts which, with the disc hubs, define a lower seal chamber for minimizing entry of grass cuttings into the chamber, and yet allowing the disc hub to sling water outwardly away from the lower bearing thus greatly minimizing damage to the lower bearing. The lower bearing is further protected by using cutter mounting cap screws which project into the seal chamber and chop any long grass fibers which enter the chamber into small pieces.

Although the best mode contemplated for carrying out the present invention has been herein shown and described, it will be apparent that modification and variation may be made without departing from what is regarded to be the subject matter of the invention.

What I claim is:

1. A close coupled bearing assembly having a relatively large spacing between bearings comprising: a bearing housing having means defining an inner wall and means defining an outer wall; an outer annular skirt projecting axially outward beyond said inner wall and defining one end portion of said outer wall; means defining bearing supporting counterbores in each end portion of said inner wall; a pair of bearings spaced a predetermined distance apart with one bearing seated in one counterbore and the other bearing seated in the other counterbore; a shaft journaled by said bearings; a rotatable tool mounting hub having a circular periphery and an inner planar surface immediately adjacent said one bearing, said hub being rigidly secured to one end of said shaft and having a least a portion of its outer periphery surrounded by and disposed immediately adjacent the inner wall of said skirt; and means for holding said shaft from axial movement relative to said bearings with said inner planar surface of said tool mounting hub being disposed sufficiently close to an end surface of one of said bearings for reliably shielding said bearing from debris and for slinging water away from said bearing; said tool mounting hub being a disc concentric with said shaft and said skirt, the outer periphery of said disc hub being spaced from said skirt about one-sixteenth of an inch to act as a seal protecting said one bearing from contamination, and said one end of said shaft terminating within the confines of said skirt.

2. A close coupled bearing assembly having a relatively large spacing between bearings comprising: a bearing housing having means defining an inner wall and means defining an outer wall; an outer annular skirt projecting axially outward beyond said inner wall and defining one end portion of said outer wall; means defining bearing supporting counterbores in each end portion of said inner wall; a pair of bearings spaced a predetermined distance apart with one bearing seated in one countervore and the other bearing seated in the other counterbore; a shaft journaled by said bearings; a rotatable tool mounting hub having a circular periphery and an inner planar surface immediately adjacent said one bearing, said hub being rigidly secured to one end of said shaft and having at least a portion of its outer periphery surrounded by and disposed immediately adjacent the inner wall of said skirt; means for holding said shaft from axial movement relative to said bearings with said inner planar surface of said tool mounting hub being disposed sufficiently close to an end surface of one of said bearings for reliably shielding said bearing from debris and for slinging water away from said one bearing; and an inner annular skirt forming a part of said inner wall and having its free end disposed immediately adjacent said inner planar surface of said tool mounting hub for acting as a secondary shield to further reduce the tendency of debris from contaminating said one bearing; said inner and outer skirts cooperating to define an annular seal chamber, and abutment means secured to said hub projecting into said chamber and upon rotation of said shaft serving to chop stringy debris which may inadvertently enter said chamber into small pieces.

3. A close coupled bearing assembly for use in a confined area comprising: a bearing housing having means defining an inner annular wall and an outer annular wall; means rigidly interconnecting said walls; means defining first and second counterbores in opposite end portions of said inner annular wall; an inner skirt formed on one end of said inner wall; an outer skirt formed on the same end of said outer wall and projecting axially beyond said inner skirt; a spindle shaft; a tool mounting hub rigidly secured to one end of said shaft and extending transversely thereof; spindle driving means on the shaft near the other end of said shaft; a tool secured to said hub for rotation therewith; a pair of spaced bearings on said shaft with one bearing received in said first counterbore and the other bearing received in said second counterbore; and a plurality of spacer means surrounding said spindle shaft and cooperating with inner portions of said bearings, said hub, and said driving means to define a column for securing a portion of each of said bearings to said shaft in predetermined spaced relationship with each other and with the outer periphery of said hub; means secured to said shaft to clamp said inner bearing portion and said spacers between said hub and said drive means with said hub being disposed within and immediately adjacent to said outer skirt to define an outer seal; a secondary labyrinth seal being defined by the free end of said inner skirt which is positioned immediately adjacent one face of said hub for protecting the adjacent bearing from contamination.

* * * * *